United States Patent
Matsuoka (10) Patent No.: US 7,340,517 B2
(45) Date of Patent: Mar. 4, 2008

(54) GATEWAY

(75) Inventor: Masayoshi Matsuoka, Daito (JP)

(73) Assignee: Funai Electric Co., Ltd., Daito-shi (JP)

(*) Notice: Subject to any disclaimer, the term of this patent is extended or adjusted under 35 U.S.C. 154(b) by 723 days.

(21) Appl. No.: 10/943,882

(22) Filed: Sep. 20, 2004

(65) Prior Publication Data

US 2005/0091345 A1    Apr. 28, 2005

(30) Foreign Application Priority Data

Sep. 19, 2003   (JP)   ............................. 2003-328758

(51) Int. Cl.
*G06F 15/173* (2006.01)
(52) U.S. Cl. ...................................... 709/224
(58) Field of Classification Search ................. 709/224, 709/217, 220
See application file for complete search history.

(56) References Cited

U.S. PATENT DOCUMENTS

| | | | |
|---|---|---|---|
| 6,183,651 B1 * | 2/2001 | Brown et al. ................ | 210/745 |
| 6,735,619 B1 | 5/2004 | Sawada | |
| 6,956,461 B2 * | 10/2005 | Yoon et al. ............ | 340/310.11 |
| 7,155,305 B2 * | 12/2006 | Hayes et al. ................. | 700/224 |
| 7,237,029 B2 * | 6/2007 | Hino et al. .................. | 709/227 |

FOREIGN PATENT DOCUMENTS

| | | |
|---|---|---|
| JP | 2001-053799 A | 2/2001 |
| JP | 2001-331394 | 11/2001 |
| JP | 2002-344868 | 11/2002 |
| JP | 2002-353968 A | 12/2002 |
| JP | 2003-501764 A | 1/2003 |
| WO | WO 00/76130 A1 | 12/2000 |

* cited by examiner

*Primary Examiner*—David Y. Eng
(74) *Attorney, Agent, or Firm*—Crowell & Moring LLP (57) ABSTRACT

If a new AV device is connected to an IEEE 1394 network, and if the subunit type of the newly connected AV device is an unregistered subunit type, then a microprocessor of a gateway downloads a CGI and a Web page generation module, both corresponding to the newly connected AV device, to the gateway from an information device on an IP network or from the newly connected AV device. Thus, using the Web page generation module corresponding to the newly connected AV device, the microprocessor of the gateway can automatically generate a Web page to operate such new AV device. Hence, using the Web page sent from the gateway and using the CGI (command conversion module), which is stored in the gateway and which corresponds to the newly connected AV device, an information device on the IP network can control the newly connected AV device, wherein the latter information device for control of the newly connected AV device can be either the same as or different from the former information device for download of the CGI and the Web page generation module.

10 Claims, 4 Drawing Sheets

GATEWAY

BACKGROUND OF THE INVENTION

1. Field of the Invention

The present invention relates to a gateway to act as an interface for data transfer between information device(s) on an IP (Internet Protocol) network and AV (audio/video) devices on an IEEE 1394 network.

2. Description of the Related Art

There is known a gateway to act as an interface for data transfer between an information device on an IP network and AV devices on an IEEE 1394 network. For example, Japanese Laid-open Patent Publication 2001-331394 discloses a technology such that a Web page to operate a home electronic device on the IEEE 1394 network is generated in response to an HTTP request sent from a mobile terminal on the IP network, and that the Web page is sent to the mobile terminal on the IP network, and further that the home electronic device can be controlled by the mobile terminal, using the Web page.

However, if a new home electronic device is connected to the IEEE 1394 network using such conventional gateway, it is not possible to generate a Web page to operate the newly connected home electronic device. Accordingly, such conventional gateway has a problem that a home electronic device newly connected to the IEEE 1394 network cannot be controlled by a mobile terminal on the IP network.

SUMMARY OF THE INVENTION

An object of the present invention is to provide a gateway such that when an AV device is newly connected to an IEEE 1394 network, the gateway can automatically generate a Web page to operate the newly connected AV device, and that an information device on an IP network can control the newly connected AV device.

According to a first aspect of the present invention, this object is achieved by a gateway comprising: an IP (Internet Protocol) interface unit to send and receive data to and from an information device on an IP network; an IEEE 1394 LINK/PHY chip to send and receive data to and from an AV device on an IEEE 1394 network; and a microprocessor to control entire system of the gateway, using various software.

The various software includes: a Web page generation module to generate a Web page to operate the AV device; a monitoring module to monitor an HTTP request, as control request for controlling the AV device, which the information device sends when a user operates the information device using the Web page after the IP interface unit sends to the information device the Web page generated by the Web page generation module; and a command conversion module to convert the HTTP request, as the control request detected by the monitoring module, into AV/C command for controlling the AV device on the IEEE 1394 network.

Therein, when the microprocessor detects an AV device newly connected to the IEEE 1394 network, the microprocessor decides whether or not subunit type of the newly connected AV device is an unregistered subunit type, and if the decision indicates that the subunit type of the newly connected AV device is an unregistered subunit type, then the microprocessor downloads the command conversion module and the Web page generation module, both corresponding to the newly connected AV device, from the information device or a further information device on the IP network or from the newly connected AV device.

According to such the configuration as described above, if a new AV device is connected to an IEEE 1394 network, and if the subunit type of the newly connected AV device is an unregistered subunit type, then the command conversion module and the Web page generation module, both corresponding to the newly connected AV device, are downloaded to the gateway from the information device or the further information device on the IP network or from the newly connected AV device. Thus, using the Web page generation module corresponding to the newly connected AV device, a Web page to operate the new AV device can be automatically generated. Hence, using the thus automatically generated Web page and using the command conversion module which corresponds to the newly connected AV device, the information device or the further information device on the IP network can control the newly connected AV device.

Preferably, the gateway further comprises a GUID (Global Unique Identifier) storing unit to store GUID(s) of AV device(s), having been at least once connected to the IEEE 1394 network in the past, among AV devices on the IEEE 1394 network, wherein at the time when bus reset is occurred in the IEEE 1394 network, the microprocessor reads GUIDs of all the AV devices connected to the IEEE 1394 network at such time, and then compares the thus read GUIDs with the GUID(s) which is stored in the GUID storing unit so as to detect the AV device newly connected to the IEEE 1394 network.

Further preferably, the various software further includes a subunit type management module to manage subunit types of the AV devices on the IEEE 1394 network, wherein using the subunit type management module, the microprocessor decides whether or not the subunit type of the newly connected AV device is an unregistered subunit type.

According to a second aspect of the present invention, the above-described object is achieved by a gateway comprising: an IP (Internet Protocol) interface unit to send and receive data to and from an information device on an IP network; an IEEE 1394 LINK/PHY chip to send and receive data to and from an AV device on an IEEE 1394 network; and a microprocessor to control entire system of the gateway, using various software.

The various software includes: a Web page generation module to generate a Web page to operate the AV device; a monitoring module to monitor an HTTP request, as control request for controlling the AV device, which the information device sends when a user operates the information device using the Web page after the IP interface unit sends to the information device the Web page generated by the Web page generation module; and a command conversion module to convert the HTTP request, as the control request detected by the monitoring module, into AV/C command for controlling the AV device on the IEEE 1394 network.

Therein, when the microprocessor detects an AV device newly connected to the IEEE 1394 network, the microprocessor decides whether or not subunit type of the newly connected AV device is an unregistered subunit type, and if the decision indicates that the subunit type of the newly connected AV device is an unregistered subunit type, then the microprocessor downloads the command conversion module and the Web page generation module, both corresponding to the newly connected AV device, from the information device or a further information device on the IP network.

According to a third aspect of the present invention, the above-described object is achieved by a gateway comprising: IP (Internet Protocol) transmission means to send and receive data to and from an information device on an IP network; IEEE 1394 transmission means to send and receive data to and from an AV device on an IEEE 1394 network; Web page generation means to generate a Web page to operate the AV device; monitoring means to monitor an HTTP request, as control request for controlling the AV device, which the information device sends when a user operates the information device using the Web page after the IP transmission means sends to the information device the Web page generated by the Web page generation means; command conversion means to convert the HTTP request, as the control request detected by the monitoring means, into AV/C command for controlling the AV device on the IEEE 1394 network; detection means to detect an AV device newly connected to the IEEE 1394 network; decision means to decide whether or not subunit type of the newly connected AV device is an unregistered subunit type; and download means to download, from the information device or a further information device on the IP network or from the newly connected AV device, modules to realize the command conversion means and the Web page generation means, both corresponding to the newly connected AV device, if the decision by the decision means indicates that the subunit type of the newly connected AV device is an unregistered subunit type.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Embodiments of the present invention, as best mode for carrying out the invention, will be described hereinafter with reference to the drawings. It is to be understood that the embodiments described herein are not intended as limiting or encompassing the entire scope of the invention.

Figure 1:
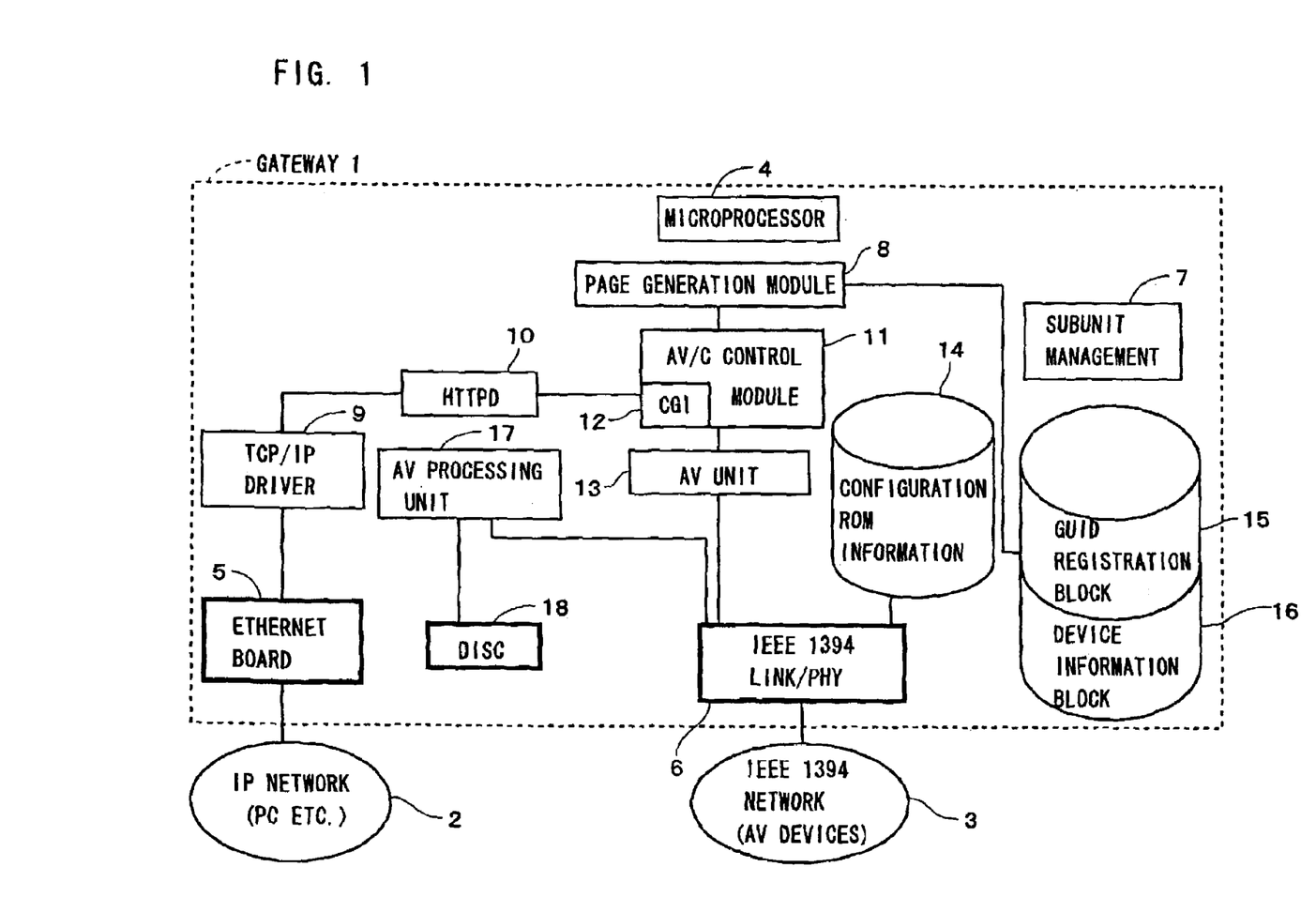
FIG. 1 is a schematic block diagram showing a configuration of a gateway according to an embodiment of the present invention.

FIG. 1 shows a schematic configuration of a gateway according to an embodiment of the present invention. The gateway 1 acts as an interface for data transfer between an information device such as PC (Personal Computer) on an IP network 2 and AV devices on an IEEE 1394 network 3 having an IEEE 1394 bus. The gateway 1 sends and receives data to and from the information device on the IP network 2 via an Ethernet that is a kind of LAN (Local Area Network). The gateway 1 comprises: a microprocessor 4 to control the entire system of the gateway 1; an Ethernet board 5 that is an interface board for connection to the Ethernet; an IEEE 1394 LINK/PHY chip 6 (claimed "IEEE 1394 transmission means") to provide services at link layer level and physical layer level in the IEEE 1394 protocol; a subunit management 7 (claimed "subunit type management module") to manage subunit types of the AV devices on the IEEE 1394 network 3; and a page generation module 8 (claimed "Web page generation module" or "Web page generation means") to generate a Web page to operate each AV device on the IEEE 1394 network 3 from the information device on the IP network 2. The microprocessor 4 functions also as claimed detection means to detect an AV device newly connected to the IEEE 1394 network. The combination of the microprocessor 4 and the subunit management 7 corresponds to claimed decision means to decide whether or not subunit type of the newly connected AV device is an unregistered subunit type.

The gateway 1 furthermore comprises: a TCP/IP (Transmission Control Protocol/Internet Protocol) driver 9 to send and receive data to and from the information device on the IP network 2; an HTTPd (Hyper Text Transfer Protocol daemon) 10 (claimed "monitoring module" or "monitoring means") that is a daemon to monitor HTTP requests received by the TCP/IP driver 9; and a CGI (Common Gateway Interface) 12 (claimed "command conversion module") to convert HTTP requests, as control requests, detected by the HTTPd 10 into AV/C (Audio/Video Control) commands for controlling the AV devices on the IEEE 1394 network 3. The CGI 12 also has a function such that, in accordance with contents of HTTP requests from the information device on the IP network 2, the CGI 12 changes displayed contents of Web pages generated by the page generation module 8. The above-described Ethernet board 5, TCP/IP driver 9 and microprocessor 4 correspond respectively to claimed IP interface unit, claimed IP transmission means and claimed download means. Further, the combination of the HTTPd 10 and the microprocessor 4 corresponds to claimed monitoring means, while the combination of the CGI 12 and the microprocessor 4 corresponds to claimed command conversion means.

The gateway 1 also comprises: an AV/C control module 11, containing the CGI 12, to send the AV/C commands converted from the HTTP requests by the CGI 12; an AV Unit 13 to perform controls specific to respective AV devices; an AV (audio/video) processing unit 17, e.g. to encode and decode audio/video signals sent from the AV devices on the IEEE 1394 network 3; and a disc 18 to store the thus processed audio/video signals. The gateway 1 furthermore comprises: configuration ROM (read-only memory) information 14 to store configurations ROMs of all the AV devices currently connected to the IEEE 1394 network 3; a GUID (Global Unique Identifier) registration block 15 (claimed "GUID storing unit" or "GUID storing means") to store (register) GUID(s) of AV device(s) having been at least once connected to the IEEE 1394 network 3 in the past, among AV devices on the IEEE 1394 network 3; and a device information block 16 to store device information linked to respective GUIDs in the GUID registration block 15.

As evident from the above description, the gateway 1 can be configured simply by downloading software to a PC which has on board: the Ethernet board 5 that is a board for connection to Ethernet; and an IEEE 1394 interface (mainly corresponding to the IEEE 1394 LINK/PHY chip 6).

Figure 2:
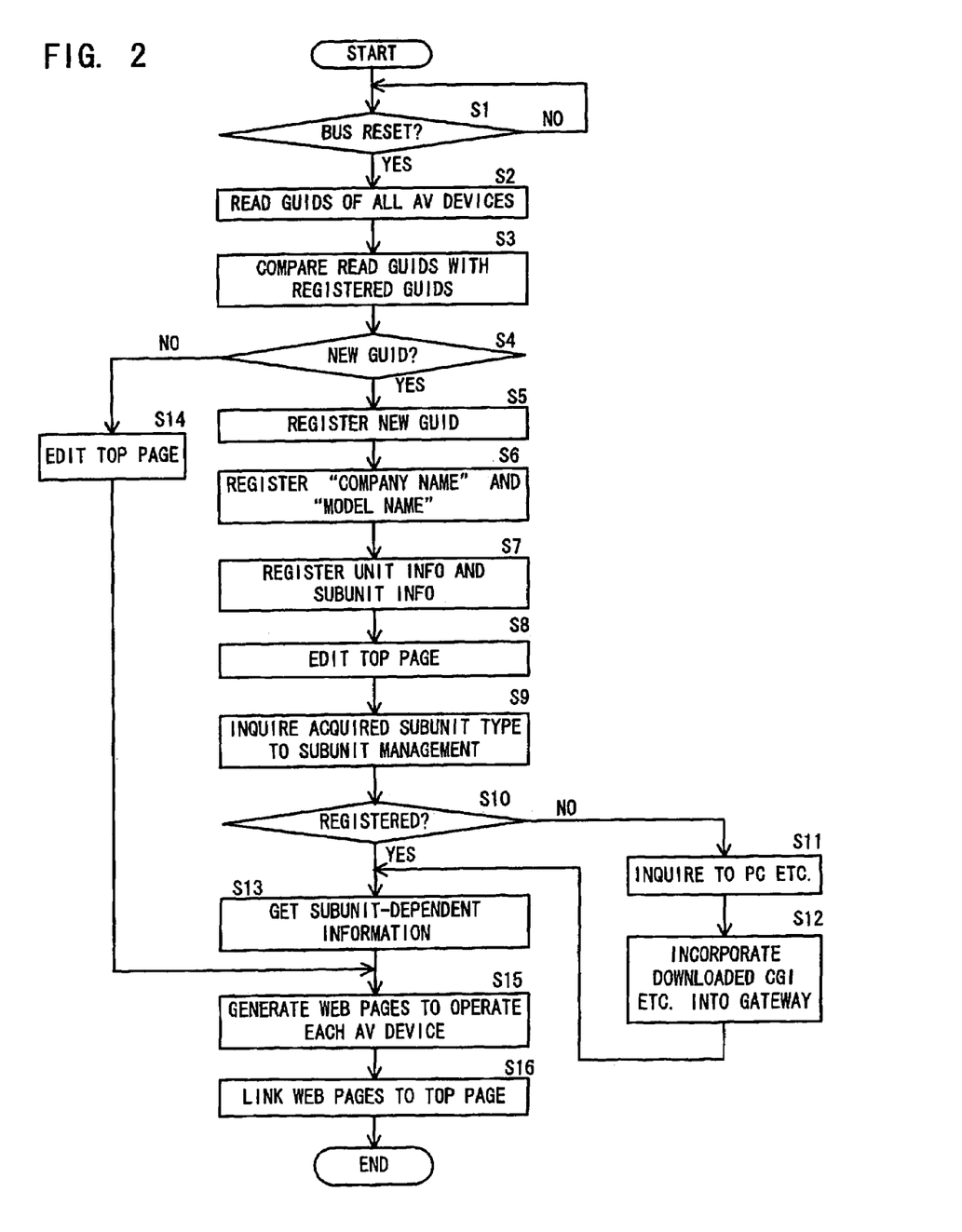
FIG. 2 is a schematic flow chart showing processes for the gateway to generate Web pages to operate AV devices.

Hereinafter, referring to the flow chart of FIG. 2, it will be described how the above-described gateway 1 generates Web pages to operate AV devices. At the time when bus reset is occurred (YES in S1), the microprocessor 4 of the gateway 1 reads, via the IEEE 1394 bus, GUIDs stored in Bus Info block in each configuration ROM of each of all the AV devices that are connected to the IEEE 1394 network 3 at such time (S2). The microprocessor 4 then compares the thus read GUIDs, one by one, with the GUIDs already registered in the GUID registration block 15 (S3).

If the comparison indicates that the thus read GUIDs include a new GUID that is not registered in the GUID registration block 15 (YES in S4), then the microprocessor 4 registers the new GUID in the GUID registration block 15 (S5). At the same time, the microprocessor 4 acquires data of "company name" and "model name" contained in the configuration ROM of the AV device of the new GUID.

Figure 3:
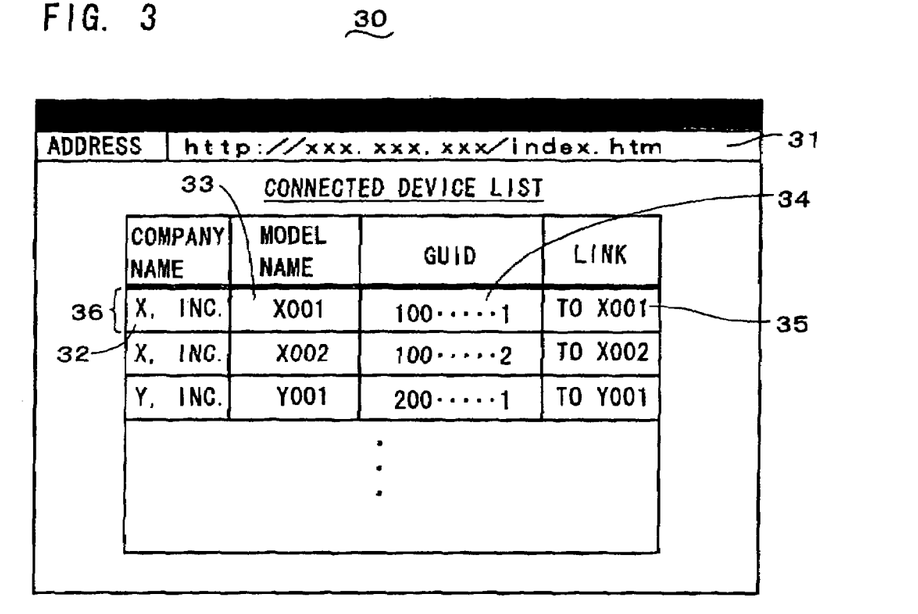
FIG. 3 is a schematic view showing a top page of the Web pages to operate the AV devices.

Next, the microprocessor 4 sends, to the AV device of the new GUID, a UNIT INFO Status command and a SUBUNIT INFO Status command in the AV/C commands, and acquires a UNIT INFO storing a unit type and a SUBUNIT INFO storing a subunit type from the AV device of the new GUID. And the microprocessor 4 registers the data of "company name" and the "model name", the UNIT INFO, and the SUBUNIT INFO in the device information block 16 as device information linked to the new GUID in the GUID registration block 15 (S6 and S7). Then, the microprocessor 4 instructs the page generation module 8 to edit a top page 30 (refer to FIG. 3) of the Web pages to operate AV devices. In response to this instruction, the page generation module 8 edits a connected device information field 36 in the table of connected devices on the top page 30 as shown in FIG. 3, using the "company name" and the "model name" acquired by the above-described process S6, the new GUID and the like (S8). When editing the first field in the connected device information fields 36, the page generation module 8 generates the top page 30 itself at the same time. On the other hand, when editing the second field or below in the connected device information fields 36, the page generation module 8 only adds such field in the connected device information fields 36.

Subsequently, the microprocessor 4 sends inquiry to the subunit management 7 to inquire the subunit type stored in the SUBUNIT INFO acquired in the above-described process S7 (S9). If such subunit type stored in the SUBUNIT INFO is one that is not recognized by the subunit management 7 (not registered in the subunit management 7) (NO in S10), then the microprocessor 4 sends inquiry to an information device such as PC on the IP network 2 to inquire whether or not such information device on the IP network 2 stores a CGI 12 and a page generation module 8 that correspond to such subunit type (S11). If this inquiry indicates that such information device stores such CGI 12 and page generation module 8, both corresponding to such subunit type, then the microprocessor 4 downloads, from such information device, such CGI 12 and page generation module 8, and incorporates such downloaded CGI 12 and page generation module 8 into the system of the gateway 1 as well as registers such subunit type in the subunit management 7 (S12). It is to be noted that the CGI 12 and the page generation module 8 that are to be incorporated can be those specific to the newly connected AV device or those standard and common to each subunit type. Basically, it is possible to support almost all AV devices to be connected to the IEEE 1394 network 3, using the standard CGI and page generation module for each subunit type.

Next, using the AV/C control module 11, the microprocessor 4 sends AV/C command to respective AV devices on the IEEE 1394 network 3, and acquires subunit-dependent information from the AV devices on the IEEE 1394 network 3 (S13). For example, if the subunit type of a target AV device is TAPE subunit, the microprocessor 4 sends a TAPE RECORDING FORMAT Status command to such target AV device to inquire therefrom kind and format of tape.

In contrast to the case as described above, if the comparison in the above-described process S3 indicates that the above read GUIDs do not include a new GUID (NO in S4), then the microprocessor 4 instructs the page generation module 8 to edit a top page 30 of the Web pages to operate AV devices. In response to this instruction, the page generation module 8 reads, from the device information block 16, "company name" and "model name" corresponding to each of the above read GUIDs, and edits the connected device information fields 36 on the top page 30 as shown in FIG. 3, using these data and such read GUIDs (S14).

After the above-describe processes S13 or S14 is completed, the microprocessor 4 generates Web pages 40 (control pages: refer to FIG. 4) for the each subunit of the each AV device to operate the each AV device, using the page generation module 8 corresponding to the each AV device (S15), and links these control pages 40 to the above-described top page 30 (refer to FIG. 3) (S16).

In the following, the format of the above-described top page 30 will be described. As shown in FIG. 3, the top page 30 mainly comprises an address display field 31 and the connected device information fields 36. Each field in the connected device information fields 36 comprises a company name column 32, a model name column 33, a GUID column 34 and a link button 35. The number of fields in the connected device information fields 36 displayed on the top page 30 is the number of AV devices on the IEEE 1394 network 3. It is to be noted that the above-described each link button 35 is provided as a button for link to the control page 40 for each AV device.

Figure 4:
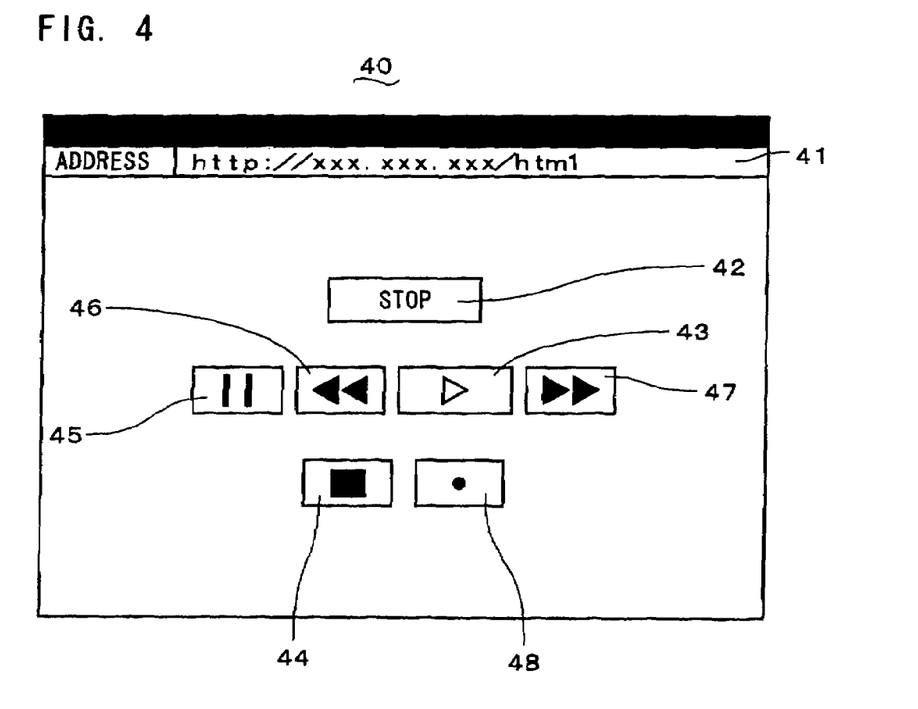
FIG. 4 is a schematic view showing a Web page, linked to the top page, to operate each AV device.

Next, the format of the above-described control page 40 will be described. As shown in FIG. 4, the control page 40 mainly comprises an address display field 41, a status display field 42 and various buttons to operate each AV device. The contents of the buttons to operate the each AV device vary with each subunit type. For example, in the case where the subunit type is video tape recorder, the buttons to operate the AV device comprise a reproduction button 43, a stop button 44, a pause button 45, a rewind button 46, a fast forward button 47 and a record button 48.

Below, a process will be described which enables an information device on the IP network 2 to use the above-described control page 40. When a user operates to make the information device on the IP network 2 display a control page 40 described above, a microprocessor of such the operated information device requests the gateway 1 to send the control page 40 to the information device. When detecting this request by using the HTTPd 10, the microprocessor 4 of the gateway 1 generates a control page 40 corresponding to the information device, using the page generation module 8. The microprocessor 4 of the gateway 1 further sends the control page 40 to the information device. When receiving the control page 40 from the gateway 1, the microprocessor of the information device displays the received control page 40 on a display of the information device itself, using a Web browser which the information device has.

Hereinafter, processes performed by the gateway 1, an information device on the IP network 2 and an AV device on the IEEE 1394 network 3 will be described in the case where the information device operates the AV device using the above-described control page 40. It is to be noted that, in order to describe functions of respective modules in the information device, the AV device and the gateway 1, the names of such modules will be frequently used as subjects to make sentences in the following descriptions. However, actually the microprocessor in each of the three devices, i.e. the information device, the AV device and the gateway 1, reads such module stored in the each device, and executes operations in accordance with instruction codes written in such module.

When a user clicks either one of the buttons 43 to 48 on the control page 40 to operate the AV device, the Web browser of the information device sends a message to the HTTPd 10 of the gateway 1, using the POST method of HTTP. The HTTPd 10 of the gateway 1 sets the received message as a parameter and calls the CGI 12 to convert it into AV/C command. Using the AV/C command converted by the CGI 12, the HTTPd 10 of the gateway 1 controls the AV device on the IEEE 1394 network 3, and returns the result to the Web browser of the information device on the IP network 2.

Figure 5:
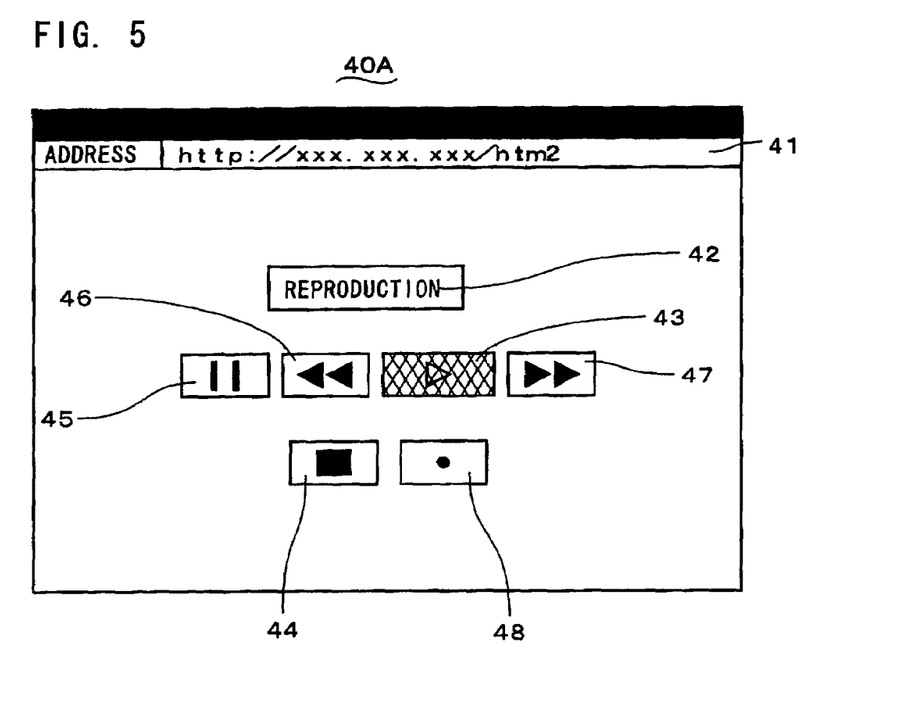
FIG. 5 is a schematic view showing the Web page to operate the AV device as shown in FIG. 4, after a reproduction button is clicked.

Taking the case of FIG. 4 for example, when the reproduction button 43 is clicked by a user in the tape stop status, the video tape recorder on the IEEE 1394 network 3 is controlled to start reproduction. Further, a control page 40A as shown in FIG. 5 is displayed on a browser screen of the information device on the IP network 2, wherein the control page 40A displays "Reproduction" in a status display field 42 and also displays a reproduction button 43 displayed in half-tone dot meshing. The change from the control page 40 in the tape stop status as shown in FIG. 4 to the control page 40A in the reproduction status as shown in FIG. 5 is made by CGI 12 corresponding to the video tape recorder.

In the case where the subunit type is tuner, the control page 40 is to comprise a current channel display field, a channel up button, a channel down button and a broadcast program information field. If both a video tape recorder and a tuner are present on the IEEE 1394 network 3, it is possible to perform reserved recording, so that in such case the control page 40 of the video tape recorder is to be provided with a reserved recording button.

Figure 6:
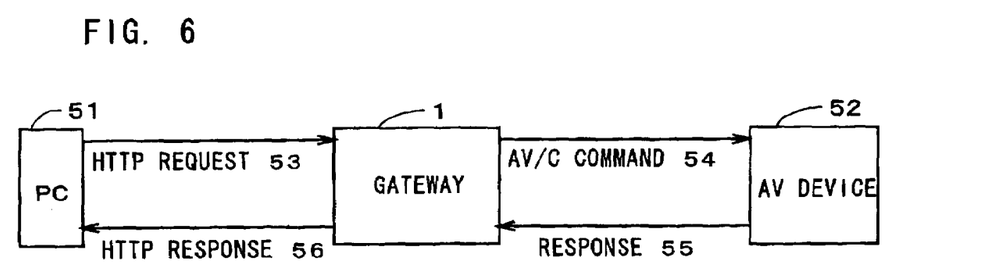
FIG. 6 is a schematic explanatory view showing data transmitted via the gateway between a PC on an IP network and an AV device on an IEEE 1394 network.

Next, referring to FIG. 6, data transmitted via the gateway 1 between a PC 51 on the IP network 2 and an AV device 52 on the IEEE 1394 network 3 will be described in the case where a button on a control page 40 to operate the AV device is clicked by a user. When a user clicks either one of the buttons on the control page 40, displayed in the browser, to operate the AV device 52, then the Web browser of the PC 51 sends to the gateway 1 an HTTP request 53 corresponding to the clicked button. When receiving this HTTP request 53, the gateway 1 converts the received HTTP request 53 into AV/C command 54, using the CGI 12, and sends the thus converted AV/C command 54 to the AV device 52. The gateway 1 receives a response 55 from the AV device 52 in response to the AV/C command 54, and converts the thus received response 55 into an HTTP response 56, using the CGI 12, and further sends the thus converted HTTP response 56 to the PC 51. Data sent with the HTTP response 56 to the PC 51 include data of a control page 40A having been changed in the displayed contents by the CGI 12 in accordance with the HTTP request 53 from the PC 51.

Besides, using the gateway 1 and components defined by IEC 61883 standard, it is possible to download into the gateway 1 audio/video data sent from the AV device 52 on the IEEE 1394 network 3. The AV processing unit 17 processes the thus downloaded audio/video data, and the disc 18 stores the thus processed audio/video data. The downloaded data are also supplied in stream data format to the PC 51 serving as a controller. In order to make it possible to watch and listen to the stream data by the PC 51 as the controller, it is necessary that the PC 51 have a stream reproduction module (decoder and viewer) which is linked to a Web browser.

As described in the foregoing, the gateway 1 according to the present embodiment has the following features and advantages. If a new AV device is connected to the IEEE 1394 network 3, and if the subunit type of the newly connected AV device is an unregistered subunit type, then the microprocessor 4 of the gateway 1 downloads a CGI 12 and a page generation module 8, both corresponding to the newly connected AV device, from an information device on the IP network 2, and incorporates the downloaded CGI 12 and page generation module 8 into the system of the gateway 1. Thus, using the page generation module 8 corresponding to the newly connected AV device, the microprocessor 4 of the gateway 1 can automatically generate a Web page to operate such the new AV device. Hence, using the automatically generated Web page and the CGI 12 corresponding to the newly connected AV device, an information device on the IP network 2 can control the newly connected AV device. Note here that the above-described information device from which the CGI 12 and the page generation module 8 are downloaded can be either the same as or different from the above-described information device to control the AV device. In other words, if the latter information device is referred to as an information device, the former information device can be referred to as either the information device the same as the latter information device, or as a further information device different from the latter information device.

It is to be noted that the present invention is not limited to the above-described embodiment, and various modifications are possible. For example, according to the above-described embodiment, if the subunit type of an AV device newly connected to the IEEE 1394 network 3 is one that is not registered in the subunit management 7, then a CGI 12 and a page generation module 8 both corresponding to such the subunit type are downloaded by the microprocessor 4 to the gateway 1 from an information device such as PC on the IP network 2. However, such CGI 12 and page generation module 8 corresponding to the subunit type can be downloaded to the gateway 1 from the AV device itself newly connected to the IEEE 1394 network 3. Furthermore, according to the above-described embodiment, such subunit management 7 is provided that is a module to manage subunits of AV devices on the IEEE 1394 network 3, wherein subunit types that are not registered in the subunit management 7 are registered one by one in the subunit management 7. However, instead of such method, it is also possible to register in the subunit management 7 only subunit types that the system of the gateway 1 supports as standard subunit types.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

This application is based on Japanese patent application 2003-328758 filed in Japan dated Sep. 19, 2003, the contents of which are hereby incorporated by reference.

What is claimed is:

1. A gateway comprising:
   an IP (Internet Protocol) interface unit to send and receive data to and from an information device on an IP network;
   an IEEE 1394 LINK/PHY chip to send and receive data to and from an AV device on an IEEE 1394 network; and
   a microprocessor to control entire system of the gateway, using various software, the various software including:
   a Web page generation module to generate a Web page to operate the AV device;
   a monitoring module to monitor an HTTP request, as control request for controlling the AV device, which the information device sends when a user operates the information device using the Web page after the IP interface unit sends to the information device the Web page generated by the Web page generation module; and
   a command conversion module to convert the HTTP request, as the control request detected by the monitoring module, into AV/C command for controlling the AV device on the IEEE 1394 network,
   wherein when the microprocessor detects an AV device newly connected to the IEEE 1394 network,
   the microprocessor decides whether or not subunit type of the newly connected AV device is an unregistered subunit type, and if the decision indicates that the subunit type of the newly connected AV device is an unregistered subunit type, then
   the microprocessor downloads the command conversion module and the Web page generation module, both corresponding to the newly connected AV device, from the information device or a further information device on the IP network or from the newly connected AV device.

2. The gateway according to claim 1, which further comprises a GUID (Global Unique Identifier) storing unit to store GUID(s) of AV device(s), having been at least once connected to the IEEE 1394 network in the past, among AV devices on the IEEE 1394 network, wherein at the time when bus reset is occurred in the IEEE 1394 network,
   the microprocessor reads GUIDs of all the AV devices connected to the IEEE 1394 network at such time, and then compares the thus read GUIDs with the GUID(s) which is stored in the GUID storing unit so as to detect the AV device newly connected to the IEEE 1394 network.

3. The gateway according to claim 2, wherein the various software further includes a subunit type management module to manage subunit types of the AV devices on the IEEE 1394 network, and wherein using the subunit type management module, the microprocessor decides whether or not the subunit type of the newly connected AV device is an unregistered subunit type.

4. The gateway according to claim 1, wherein the various software further includes a subunit type management module to manage subunit types of the AV devices on the IEEE 1394 network, and wherein using the subunit type management module, the microprocessor decides whether or not the subunit type of the newly connected AV device is an unregistered subunit type.

5. A gateway comprising:
   an IP (Internet Protocol) interface unit to send and receive data to and from an information device on an IP network;
   an IEEE 1394 LINK/PHY chip to send and receive data to and from an AV device on an IEEE 1394 network; and
   a microprocessor to control entire system of the gateway, using various software, the various software including:
   a Web page generation module to generate a Web page to operate the AV device;
   a monitoring module to monitor an HTTP request, as control request for controlling the AV device, which the information device sends when a user operates the information device using the Web page after the IP interface unit sends to the information device the Web page generated by the Web page generation module; and
   a command conversion module to convert the HTTP request, as the control request detected by the monitoring module, into AV/C command for controlling the AV device on the IEEE 1394 network,
   wherein when the microprocessor detects an AV device newly connected to the IEEE 1394 network,
   the microprocessor decides whether or not subunit type of the newly connected AV device is an unregistered subunit type, and if the decision indicates that the subunit type of the newly connected AV device is an unregistered subunit type, then
   the microprocessor downloads the command conversion module and the Web page generation module, both corresponding to the newly connected AV device, from the information device or a further information device.

6. The gateway according to claim 5, which further comprises a GUID (Global Unique Identifier) storing unit to store GUID(s) of AV device(s), having been at least once connected to the IEEE 1394 network in the past, among AV devices on the IEEE 1394 network, wherein at the time when bus reset is occurred in the IEEE 1394 network,
   the microprocessor reads GUIDs of all the AV devices connected to the IEEE 1394 network at such time, and then compares the thus read GUIDs with the GUID(s) which is stored in the GUID storing unit so as to detect the AV device newly connected to the IEEE 1394 network.

7. The gateway according to claim 6, wherein the various software further includes a subunit type management module to manage subunit types of the AV devices on the IEEE 1394 network, and wherein using the subunit type management module, the microprocessor decides whether or not the subunit type of the newly connected AV device is an unregistered subunit type.

8. The gateway according to claim 5, wherein the various software further includes a subunit type management module to manage subunit types of the AV devices on the IEEE 1394 network, and wherein using the subunit type management module, the microprocessor decides whether or not the subunit type of the newly connected AV device is an unregistered subunit type.

9. A gateway comprising:
   IP (Internet Protocol) transmission means to send and receive data to and from an information device on an IP network;
   IEEE 1394 transmission means to send and receive data to and from an AV device on an IEEE 1394 network;
   Web page generation means to generate a Web page to operate the AV device;
   monitoring means to monitor an HTTP request, as control request for controlling the AV device, which the information device sends when a user operates the information device using the Web page after the IP transmission means sends to the information device the Web page generated by the Web page generation means;

command conversion means to convert the HTTP request, as the control request detected by the monitoring means, into AV/C command for controlling the AV device on the IEEE 1394 network;

detection means to detect an AV device newly connected to the IEEE 1394 network;

decision means to decide whether or not subunit type of the newly connected AV device is an unregistered subunit type; and download means to download, from the information device or a further information device on the IP network or from the newly connected AV device, modules to realize the command conversion means and the Web page generation means, both corresponding to the newly connected AV device, if the decision by the decision means indicates that the subunit type of the newly connected AV device is an unregistered subunit type.

10. The gateway according to claim 9, which further comprises GUID (Global Unique Identifier) storing means to store GUID(s) of AV device(s), having been at least once connected to the IEEE 1394 network in the past, among AV devices on the IEEE 1394 network, wherein at the time when bus reset is occurred in the IEEE 1394 network, the detection means reads GUIDs of all the AV devices connected to the IEEE 1394 network at such time, and then compares the thus read GUIDs with the GUID(s) which is stored in the GUID storing unit so as to detect the AV device newly connected to the IEEE 1394 network.

* * * * *